United States Patent
Zwickel et al.

(10) Patent No.: US 7,293,690 B2
(45) Date of Patent: Nov. 13, 2007

(54) METHOD OF MANUFACTURING METALLIC COMPOSITE MATERIAL

(75) Inventors: Gerald Otto Zwickel, Biedenkopf (DE); Karl Friedrich Fick, Hoehr-Grenzhausen (DE)

(73) Assignee: Aleris Aluminum Koblenz GmbH, Koblenz (DE)

( * ) Notice: Subject to any disclaimer, the term of this patent is extended or adjusted under 35 U.S.C. 154(b) by 651 days.

(21) Appl. No.: 10/468,851

(22) PCT Filed: Feb. 27, 2002

(86) PCT No.: PCT/EP02/02141

§ 371 (c)(1),
(2), (4) Date: Feb. 12, 2004

(87) PCT Pub. No.: WO02/068185

PCT Pub. Date: Sep. 6, 2002

(65) Prior Publication Data

US 2006/0113353 A1    Jun. 1, 2006

(30) Foreign Application Priority Data

Feb. 27, 2001    (EP) .................. 01200728

(51) Int. Cl.
*B23K 31/02* (2006.01)
(52) U.S. Cl. ................................. 228/235.2
(58) Field of Classification Search ............ None
See application file for complete search history.

(56) References Cited

U.S. PATENT DOCUMENTS 2,993,269 A * 7/1961 Kelley ................ 228/117
3,397,045 A * 8/1968 Winter ................ 428/612
3,711,937 A   1/1973 Emley
4,477,011 A * 10/1984 Austin ................ 228/173.2
4,551,219 A * 11/1985 Flick et al. ............ 204/290.13
6,427,904 B1 * 8/2002 Groll ................... 228/265

FOREIGN PATENT DOCUMENTS

| FR | 2563637 | 10/1985 |
| JP | 63140782 | 6/1988 |
| JP | 63207483 | 8/1988 |
| JP | 08336929 | 12/1996 |
| JP | 0957465 | 3/1997 |

OTHER PUBLICATIONS

Patent Abstracts of Japan, vol. 1997, No. 07 (Jul. 31, 1997).
Patent Abstracts of Japan, vol. 012, No. 392 (Oct. 19, 1988).
Patent Abstracts of Japan, vol. 1997, No. 04 (Apr. 30, 1997).
Patent Abstracts of Japan, vol. 012, No. 485 (Dec. 19, 1988).

* cited by examiner

*Primary Examiner*—Jonathan Johnson
(74) *Attorney, Agent, or Firm*—Stevens, Davis, Miller & Mosher, LLP

(57) ABSTRACT

Disclosed is a method of manufacturing a metallic composite material for use as building material, the metallic composite material including an aluminium core sheet and a titanium clad layer on at least one side of the core sheet. The aluminium core sheet and titanium clad layer are bonded to one another by roll-bonding wherein only the aluminium core sheet prior to roll bonding is preheated to a temperature in the range of 50 to 200° C. The use of such metallic composite material and to a metallic composite material as such are also disclosed.

23 Claims, No Drawings

METHOD OF MANUFACTURING METALLIC COMPOSITE MATERIAL

The invention relates to a method of manufacturing a metallic composite material, in particular for use as a building material, said metallic composite material comprising an aluminium core sheet and a titanium clad layer on one or both sides of the core sheet. The invention further relates to the use of such metallic composite material and to a metallic composite material as such.

Within the scope of this invention roll forming, also known as contour roll forming or cold roll forming, is understood to be a continuous process for forming metal sheet, strip, or coiled stock into desired shapes of essentially uniform thickness by feeding the stock through a series of roll stations equipped with contoured rolls, see also Metals Handbook, 9th. edition, Vol. 14, ASM International, 1988, pp. 624-635.

Metallic composite materials comprising a core sheet bonded with a titanium or titanium alloy clad layer to one surface or both surfaces of the core sheet are known in the art. For example thick carbon steel sheet or plate clad with titanium are employed in various constructions, in particular for use in the chemical industry and heat-exchangers, in which applications the very good corrosive performance of the titanium cladding is exploited. Typically copper or copper alloys are used as an intermediate layer between the carbon steel and the titanium clad layer.

In another example aluminium core sheet clad with titanium can be used as building material, such as roofs and external walls. In this application the good anti-corrosive properties of the titanium are used. In addition titanium has a high-tech and very appealing appearance.

The Japanese laid open patent publication JP-A-09-57465 discloses a method of manufacturing a metallic composite material, said metallic composite material comprising an aluminium core sheet and a titanium clad layer on one or both sides of the core sheet. The essence of the disclosed method lies in that the aluminium and titanium are metallurgically bonded by an explosive bonding method. In the disclosed example illustration the invention a 50 mm thick aluminium plate has been bonded on one side by means of explosive bonding to a 5 mm thick titanium plate. The resultant product is a 55 mm composite plate material. The plate material was subsequently cold rolled at room temperature to a final gauge of 1.1 mm. The other dimensions of the final sheet product were 3 m×4 m. After 2 years exposure of the resultant metallic composite sheet product to a marine coastal environment, no corrosion on the titanium surface occurred.

A draw-back of the known method is that the metallic materials are bonded to one another by means of explosive bonding, which is a rather complex technique. A further disadvantage of explosive bonding is that it can only be applied batch-wise, and thereby limiting the dimensions of the resultant composite sheet product. A further disadvantage of the disclosed method is that in order to obtain of sheet product a 98% cold rolling degree needs to be applied. This cold rolling degree can only be obtained in multiple rolling steps, which require intermediate heat-treatment of the product to improve workability. And yet a further disadvantage of the disclosed method is that the resultant sheet product is that the formability, e.g. by means of roll forming, is limited due to the strain hardening as a result from the cold rolling.

U.S. Pat. No. 3,711,937 discloses a process of cladding aluminium sheet with a sheet of titanium by bringing the surfaces of the sheets into momentary contact under a pressure by means of hot rolling, and whereby both the aluminium sheet and the titanium sheet are being pre-heated to a temperature of 500 to 1000° F. (260 to 538° C.), preferably in a range of 600 to 850° F. (315 to 454° C.), and post-heating the composite sheet for a period of 0.1 to 1.0 hours at a temperature of 500 to 1150° F. (260 to 620° C.) to develop the bond. The composite metal produced by the disclosed process find their major application in electro-chemical processing and in structural applications in the aircraft and aerospace industries.

The Japanese laid open patent publication JP-A-08-336929 discloses a titanium-aluminium clad product for building purposes, whereby the ratio $r_1$ of the thickness of the titanium layer to the thickness of the whole plate is expressed by $0.05 \leq r_1 \leq 0.6$. This ratio is said to improve on the springback behaviour of the clad product. The clad product has been manufactured by means of roll-bonding and whereby at least the aluminium sheet has been pre-heated to a temperature of 450° C.

It is an object of the present invention to provide a method of manufacturing a metallic composite material for use as a building material, said metallic composite material comprising an aluminium core sheet and a titanium clad layer on one or both sides of the core sheet, which method requires less complex process steps compared to the prior art described above.

It is another object of the present invention to provide a method of manufacturing a metallic composite material for use as a building material, said metallic composite material comprising an aluminium core sheet and a titanium clad layer on one or both sides of the core sheet, which method requires a reduced number of rolling steps for obtaining a final gauge composite product.

And it is another object of the present invention to provide a method of manufacturing a metallic composite material for use as a building material, said metallic composite material comprising an aluminium core sheet and a titanium clad layer on one or both sides of the core sheet, which method results in a metallic composite material which has an excellent formability, in particular by means of roll-forming.

Yet another object of the present invention is to provide a method of manufacturing a metallic composite material for use as building material, ideally suitable as a roofing material.

According to the invention in one aspect there is provided a method of manufacturing a metallic composite material, ideally suitable for use as building material, said metallic composite material comprising an aluminium core sheet and a titanium clad layer on at least one side of the core sheet, characterised in that the aluminium core sheet and titanium clad layer are bonded to one another by roll-bonding or roll-cladding and wherein only the aluminium core sheet prior to roll bonding is being preheated to a temperature in the range of 50 to 200° C., and preferably in the range of 110 to 200° C.

The method of the invention achieves the effect that explosive bonding is not required to manufacture the metallic composite material. By means of roll-bonding an excellent metallurgical bond is obtained between the aluminium core sheet and the titanium clad layer. By preheating only the aluminium in the given range the metallurgical bond between the two different metal sheets is further improved significantly, and which allows the material to be subsequently formed by means of roll-forming. The skilled person will not designate the preheat temperature range for the aluminium cores sheet just prior to roll-bonding as hot rolling. For the aluminium core sheet preheat temperatures above 200° C. should be avoided, in order to sufficiently retain in particular the formability properties of the aluminium alloy in the resultant roll-bonded composite material.

Roll-bonding allows for the production of end-less sheet material, e.g. coiled sheet material, whereas explosive bonding puts significant restrictions on the dimensions of the final composite sheet product. An advantage of having coiled metallic composite material is that it can be transported very cost efficiently to a construction site, on which construction site it may be rolled formed immediately, into for example roofing material, having dimensions of 50 to 100 cm wide and a length as desired, e.g. 7 to 15 m or even more. It has been found that there is no mandatory need to increase the temperature of the titanium clad sheet also just prior to bonding via roll-bonding. In order to avoid oxidation of the surface of the titanium clad layer facing the aluminium core sheet it is even preferred that the titanium clad layer does not reach a temperature significantly above ambient temperature. In an industrial line the aluminium core sheet can be heated by known means to the increased temperature, and whereby a typical line-speed would be in the range of 10-25 m/s. The location of heating could be 2 to 5 m before it comes into line contact with the titanium clad layer. With such line-speeds the temperature of the aluminium core sheet remains almost unchanged prior to facing the titanium clad layer.

In an embodiment of the method according to the invention, the roll-bonding is carried out with a total rolling degree, being the total reduction in thickness direction, of not more than 50%. By increasing the temperature of the aluminium core sheet in the given range, it is possible to achieve a very good bonding between the aluminium core sheet and the titanium clad layer without the requirement of a high deformation or rolling degree.

In a preferred embodiment of the method according to the invention, the roll-bonding is carried out with a total rolling degree of not more than 45%, and more preferably of not more than 40%. In order to establish a good metallurgical bond between the aluminium and the titanium sheet a suitable lower limit for the rolling degree would be about 25%, and more preferably 30%. By increasing the temperature of the aluminium core sheet in the given range, it is possible to achieve a very good bonding between the aluminium core sheet and the titanium clad layer without the requirement of a high deformation of rolling degree. By applying the rolling degree in the given range the surfaces of the resultant metallic composite material have significantly less strain hardening, which allows for the material to have a desirable high degree of formability, in particular by means of roll-forming.

In a preferred embodiment of the method according to the invention the roll-bonding is carried out in one single rolling step. By applying the rolling degree in the given range in one single rolling step an excellent metallurgical bond between the aluminium core sheet and the titanium clad layer is obtained, and the surfaces of the resultant metallic composite material have significantly less strain hardening, which allows for the material to have a desirable high degree of formability, in particular by means of roll-forming. Furthermore, by means of roll-bonding in one single rolling step there is no need for intermediate annealing treatments at elevated temperature to recover workability of the intermediate product for further cold rolling to final gauge.

In an embodiment the method according to the invention is characterised in that it includes a pre-treatment of the surface of the titanium clad layer facing the aluminium core sheet, said pre-treatment comprises the step of brushing of said surface before the roll-bonding step. The brushing operation achieves the effect of removing at least part of the oxide-layer present on said surface. It has been found that the surface of the aluminium core sheet facing the titanium clad layer does not require any special pre-treatment, but it may be treated optionally by means of a brushing operation also. Preferably said brushing as pre-treatment is carried out in an essentially dry atmosphere, preferably using a normal atmosphere environment with no special precautionary measures taken or an inert gas atmosphere. It is preferred that no cooling fluids or the similar are applied in order to avoid re-oxidation of the brushed surface. By properly pre-treating the titanium clad layer by means of brushing, e.g. mechanically brushing, the resultant metallurgical bond between the aluminium core sheet and the titanium clad layer is further improved significantly.

Following the roll-bonding of sheet products into the composite material, the resultant composite material may be subjected to a final annealing treatment in one or in multiple heating steps at temperatures in a range of 350 to 550° C., preferably in the range of 400 to 540° C., for a period of 2 to 16 hours in order to improve the roll-formability of said composite material, and also to further improve the metallurgical bond between the aluminium core sheet and the titanium clad layer or layers.

Although various aluminium alloys may be employed in the method according to the invention, including those of the Aluminium Association (AA)1000 and AA6000-series, in a preferred embodiment of the method of the invention the aluminium core sheet has a composition within the ranges of the AA3000-series alloys, and a particular useful aluminium alloy is the AA3004-series alloy. It has been found that this aluminium alloy can be roll-bonded very good into titanium clad aluminium sheets, while maintaining an excellent roll-formability in the resultant composite material. Having an excellent roll-formability is an important characteristic of the composite material when the material is being used in building systems, in particular in standing-seam roofing and wall-cladding structures.

Although various titanium-alloy sheets may be employed in the method according to the invention, in a preferred embodiment of the method according to the invention non-alloyed titanium sheets are used, in particular those having a chemical composition within the ranges, in weight percent, comprising:

| | |
|---|---|
| Fe | 0.35 max., preferably 0.15 max., |
| O | 0.35 max., preferably 0.12 max., |
| N | 0.05 max., |
| C | 0.06 max., |
| H | 0.015% max., preferably 0.013% max., |
| impurities | each 0.1% max., |
| | total 0.4% max., |
| balance titanium. | |

It has been found that this type of non-alloyed titanium can be easily roll-bonded with aluminium alloys, while maintaining an excellent roll-formability in the resultant composite material, in particular when used in combination with aluminium alloys within the AA3000-series, and preferably within the AA3004-series ranges. In addition it has been found that in particular the combination of AA3004 aluminium core sheet in combination with a non-alloyed titanium clad layer allows for a cold rolling degree of up to 50% in one single rolling step during the roll-bonding operation.

In an embodiment of the method according to the invention the aluminium core sheet has a thickness after roll-bonding in the range of 0.7 to 1.5 mm, and preferably in the range of 0.9 to 1.25 mm. Each titanium clad layer has after roll-bonding a thickness in the range of 0.05 to 0.4 mm, and preferably in the range of 0.05 to 0.3 mm. The thickness of each titanium clad layer is such that the thickness is in the range of 5 to 15% of the thickness of the aluminium core sheet. This means that the thickness of the aluminium core sheet prior to roll bonding is in the range of less than 3.0 mm, which is a material readily available in endless form on a coil. Also titanium sheet having a thickness of up to 0.5 mm are readily commercially-available.

In another aspect of the invention metallic composite material obtained by the method, may be used as a building systems such as facade and roofing structures. Aluminium-titanium clad products suitable for application in building systems such as those known under the trade names KAL-ZIP and KAL-BAU may be obtained by the invention.

In another aspect of the invention there is provided a metallic composite material in sheet form, in particular a roll-formable building sheet, comprising a sheet of aluminium or aluminium alloy and a titanium clad layer applied on one side of the aluminium sheet, and wherein said titanium clad layer is applied on the core sheet by means of roll-bonding, the thickness of the aluminium core sheet is in the range of 0.7 to 1.5 mm, and preferably in the range of 0.9 to 1.25 mm, and the thickness of each titanium clad layer is in the range of 0.05 to 0.3 mm, and preferably in the range of 0.05 to 0.15 mm, the aluminium sheet has a composition within the ranges of AA3000-series aluminium alloys, and preferably within the ranges of AA3004, and the titanium clad layer has a composition, in weight percent, comprising:

| | |
|---|---|
| Fe | 0.35 max., preferably 0.15 max., |
| O | 0.35 max., preferably 0.12 max., |
| N | 0.05 max., |
| C | 0.06 max., |
| H | 0.015% max., preferably 0.013% max., |
| impurities | each 0.1% max., |
| | total 0.4% max., |
| balance titanium. | |

The invention will know be illustrated by a non-limitative example.

On an industrial scale a metallic composite product has been manufactured consisting of an aluminium sheet roll-bonded on one side with titanium sheet, whereby 0.5 mm gauge titanium sheet has been roll-bonded to 2.5 mm gauge aluminium sheet. The titanium sheet was made from TRIKUTAN RT12 (3.7025 gem DIN 17860) in the II-B condition (cold rolled, annealed and pickled) and the aluminium sheet was an AA3004-series aluminium alloy in the O-temper condition. The facing faces of both metal sheets had been pre-treated by means of brushing in order to remove at least partly the oxide-surface present. The titanium sheet was at room temperature and the aluminium sheet had been heated to a temperature of 120° C. in order to facilitate the bonding. Both metal sheets had been bonded to each other in one single cold-rolling step in a quatro cladding mill with a rolling degree of 47%, and whereby in the resultant metallic composite product the aluminium and titanium sheet had a thickness of 1.13 mm and 0.36 mm respectively. Sub-samples of the roll-bonded product had been annealed for 5 hours at 535° C. in a furnace with normal atmospheric conditions, and where after the samples were taken out of the annealing furnace and allowed to cool to room temperature. Following the annealing treatment the resultant bonding between the two metal sheets was excellent. Furthermore, the tensile properties before and after annealing had been determined in accordance with DIN-1624, incorporated herein by reference. The results are listed in Table 1, average over 6 specimen tested, and whereby "Rp 0.2" stands for the yield strength, "Rm" for the tensile strength, "Ag" for the uniform elongation and "A80" for the total elongation.

From the results of Table 1 it can be seen that the metallic composite product following the annealing has a very high elongation and relatively low yield strength enabling it to be successfully rolled formed in panels for example standing-seam roofs. Due to the good mechanical bonding the roll-forming operation can be carried out without delamination of the clad product.

TABLE 1

| | Before annealing | After annealing |
|---|---|---|
| Rp 0.2 [MPa] | 260 | 127 |
| Rm [MPa] | 305 | 194 |
| Ag [%] | 2.4 | 14.6 |
| A80 [%] | 5.3 | 27.8 |

Having now fully described the invention, it will be apparent to one of ordinary skill in the art that many changes and modifications can be made without departing from the spirit or scope of the invention as herein described.

The invention claimed is:

1. A method of manufacturing a metallic composite material for use as building material, said metallic composite material comprising an aluminium core sheet and a titanium cladding layer on at least one side of the core sheet, wherein the aluminium core sheet and titanium cladding layer are bonded to one another by roll-bonding wherein only the aluminium core sheet prior to roll bonding is preheated to a temperature in the range of 50 to 200° C.

2. A method according to claim 1, wherein the aluminium core sheet and titanium cladding layer are bonded to one another by roll-bonding wherein only the aluminium core sheet prior to roll bonding is preheated to a temperature in the range of 110 to 200° C.

3. A method according to claim 1, wherein the roll-bonding is carried out with a total rolling degree of not more than 50%.

4. A method according to claim 3, wherein the roll-bonding is carried out with a total rolling degree of not more than 45%.

5. A method according to claim 3, wherein the roll-bonding is carried out with a total rolling degree of not more than 40%.

6. A method according to claim 1, wherein the roll-bonding is carried out with a total rolling degree of at least 25%.

7. A method according to claim 6, wherein the roll-bonding is carried out with a total rolling degree of at least 30%.

8. A method according to claim 1, wherein the roll-bonding is carried out in one single rolling step.

9. A method according to claim 1, wherein the method includes pre-treatment of the surface of the titanium cladding layer facing the aluminium core sheet, said pre-treatment comprises the step of brushing of said surface before the bonding step.

10. A method according to claim 9, wherein the pre-treatment is carried out in a substantially dry atmosphere.

11. A method according to claim 9, wherein the pre-treatment is carried out in an inert gas atmosphere.

12. A method according to claim 1, wherein the aluminium core sheet has a composition within a range selected from AA1000, AA6000, or AA3000-series aluminium alloys.

13. A method according to claim 1, wherein the aluminium core sheet is made of an AA3004-series aluminium alloy.

14. A method according to claim 1, wherein the titanium cladding layer has a composition, in weight percent, comprising:

| | |
|---|---|
| Fe | 0.35 max. |
| O | 0.35 max. |
| N | 0.05 max. |
| C | 0.06 max. |
| H | 0.015% max. | impurities each 0.1% max., total 0.4% max., balance titanium.

15. A method according to claim 14, wherein the titanium cladding layer has a composition, in weight percent, comprising Fe of 0.15% max.

16. A method according to claim 14, wherein the titanium cladding layer has a composition, in weight percent, comprising O of 0.12% max.

17. A method according to claim 1, wherein the titanium cladding layer has a composition, in weight percent, consisting of:

| | |
|---|---|
| Fe | 0.35 max. |
| O | 0.35 max. |
| N | 0.05 max. |
| C | 0.06 max. |
| H | 0.015% max. | impurities each 0.1% max., total 0.4% max., balance titanium.

18. A method according to claim 1, wherein said aluminium core sheet has a thickness after roll-bonding in the range of 0.7 to 1.5 mm.

19. A method according to claim 1, wherein said aluminium core sheet has a thickness after roll-bonding in the range of 0.9 to 1.25 mm.

20. A method according to claim 1, wherein one or both of said titanium cladding layer or layers have each a thickness after roll-bonding in the range of 0.05 to 0.4 mm.

21. A method according to claim 1, wherein one or both of said titanium cladding layer or layers have each a thickness after roll-bonding in the range of 0.05 to 0.3 mm.

22. A method according to claim 1, wherein following the roll-bonding of the sheet products into a composite material, the composite material is subjected to a final annealing by holding the composite material for 2 to 16 hours at a temperature in a range of 350 to 550° C.

23. A method according to claim 1, wherein following the roll-bonding of the sheet products into a composite material, the composite material is subjected to a final annealing by holding the composite material for 2 to 16 hours at a temperature in a range of 400 to 540° C.

* * * * *